(12) United States Patent  
Mohajer

(10) Patent No.: US 11,238,101 B1
(45) Date of Patent: Feb. 1, 2022

(54) SYSTEM AND METHOD FOR INTERPRETING NATURAL LANGUAGE COMMANDS WITH COMPOUND CRITERIA

(71) Applicant: SoundHound, Inc., Santa Clara, CA (US)

(72) Inventor: Keyvan Mohajer, Los Gatos, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 0 days.

(21) Appl. No.: 17/081,996

(22) Filed: Oct. 27, 2020

Related U.S. Application Data

(63) Continuation of application No. 14/846,714, filed on Sep. 4, 2015, now abandoned.

(60) Provisional application No. 62/046,791, filed on Sep. 5, 2014.

(51) Int. Cl.
| | |
|---|---|
| *G06F 16/9032* | (2019.01) |
| *G10L 15/18* | (2013.01) |
| *G06F 16/2457* | (2019.01) |
| *G06F 3/16* | (2006.01) |
| *G10L 15/22* | (2006.01) |
| *H04N 21/482* | (2011.01) |
| *G10L 15/26* | (2006.01) |

(52) U.S. Cl.
CPC .. *G06F 16/90332* (2019.01); *G06F 16/24575* (2019.01); *G10L 15/1822* (2013.01); *G06F 3/167* (2013.01); *G10L 15/22* (2013.01); *G10L 15/26* (2013.01); *G10L 2015/223* (2013.01); *H04N 21/4828* (2013.01)

(58) Field of Classification Search
None
See application file for complete search history.

(56) References Cited

U.S. PATENT DOCUMENTS

| | | | | |
|---|---|---|---|---|
| 5,937,385 A | * | 8/1999 | Zadrozny | G10L 15/193 704/257 |
| 6,336,217 B1 | * | 1/2002 | D'Anjou | G06F 8/71 707/999.202 |
| 9,672,812 B1 | * | 6/2017 | Watanabe | G10L 15/22 |
| 9,805,018 B1 | * | 10/2017 | Richfield | G06F 40/253 |
| 2002/0010574 A1 | * | 1/2002 | Tsourikov | G06F 40/211 704/9 |

(Continued)

OTHER PUBLICATIONS

United States Office Action, U.S. Appl. No. 14/846,714, filed May 28, 2020, 15 pages.

(Continued)

*Primary Examiner* — Christopher J Raab
(74) *Attorney, Agent, or Firm* — Fenwick & West LLP

(57) ABSTRACT

A command-processing server receives a natural language command from a user. The command-processing server has a set of domain command interpreters corresponding to different domains in which commands can be expressed, such as the domain of entertainment, or the domain of travel. Some or all of the domain command interpreters recognize user commands having a verbal prefix, an optional pre-filter, an object, and an optional post-filter; the pre- and post-filters may be compounded expressions involving multiple atomic filters. Different developers may independently specify the domain command interpreters and the sub-structure interpreters on which they are based.

15 Claims, 7 Drawing Sheets

(56) References Cited

U.S. PATENT DOCUMENTS

| | | | |
|---|---|---|---|
| 2004/0068713 A1* | 4/2004 | Yannakoyorgos | ............................ G06F 11/3672 717/101 |
| 2004/0088158 A1* | 5/2004 | Sheu | ................. G06F 16/24522 704/9 |
| 2006/0036430 A1* | 2/2006 | Hu | ......................... G06F 40/211 704/10 |
| 2012/0078611 A1* | 3/2012 | Soltani | ..................... G06F 3/167 704/9 |
| 2012/0233207 A1* | 9/2012 | Mohajer | ................ G10L 15/183 707/769 |
| 2014/0280246 A1* | 9/2014 | Riggs | .................. G06F 16/2358 707/752 |
| 2015/0032443 A1* | 1/2015 | Karov | ...................... G06F 16/36 704/9 |
| 2015/0186110 A1* | 7/2015 | Kannan | ................... G06F 3/167 715/728 |

OTHER PUBLICATIONS

United States Office Action, U.S. Appl. No. 14/846,714, filed Oct. 4, 2019, 14 pages.
United States Office Action, U.S. Appl. No. 14/846,714, filed Dec. 14, 2018, 18 pages.
United States Office Action, U.S. Appl. No. 14/846,714, filed Mar. 9, 2018, 16 pages.

* cited by examiner

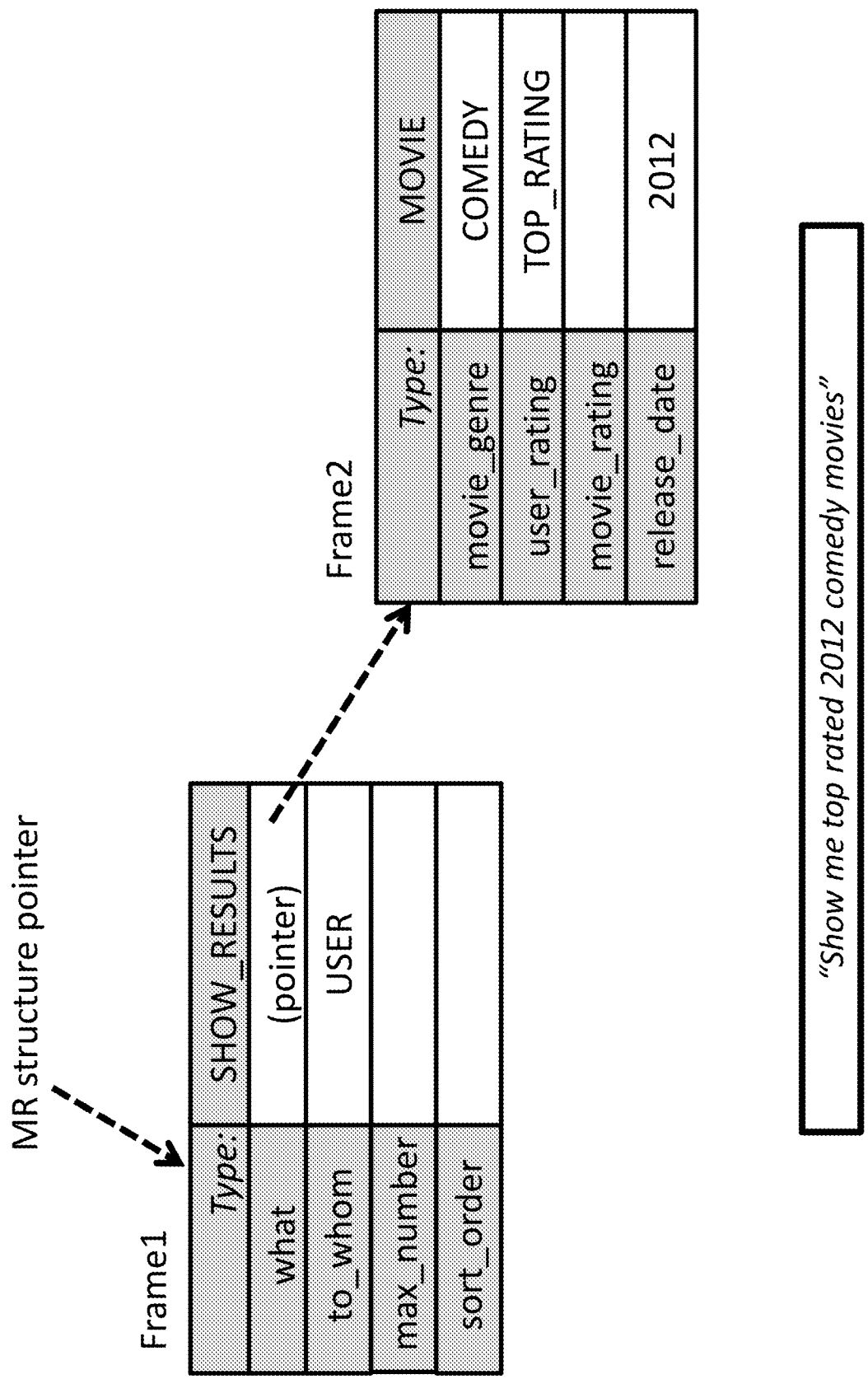
FIG. 2: Sample Meaning Representation for a Sample Query

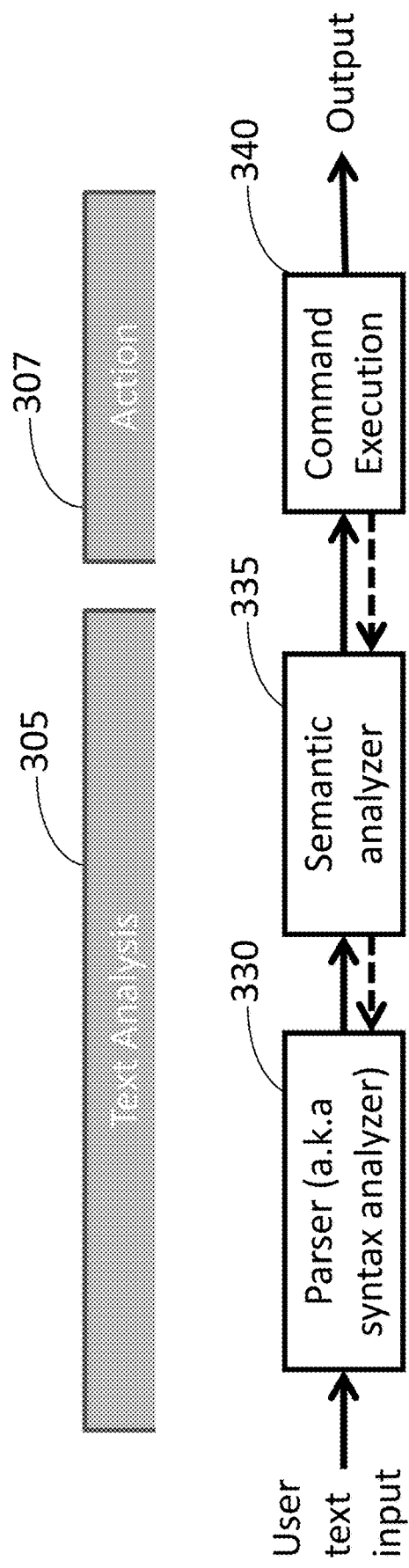
FIG. 3A: The Command Processing Chain

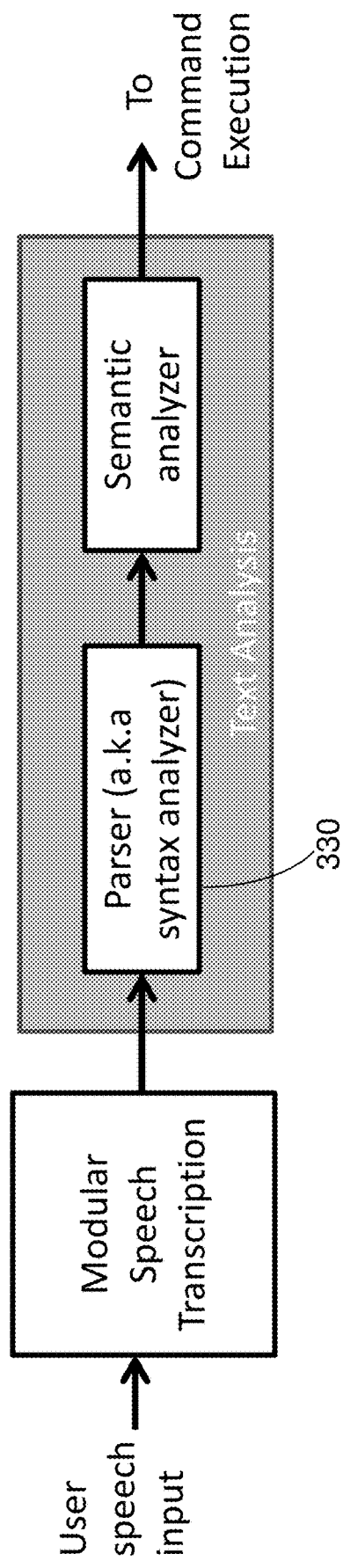
FIG. 3B: Modular Speech Processing Chain
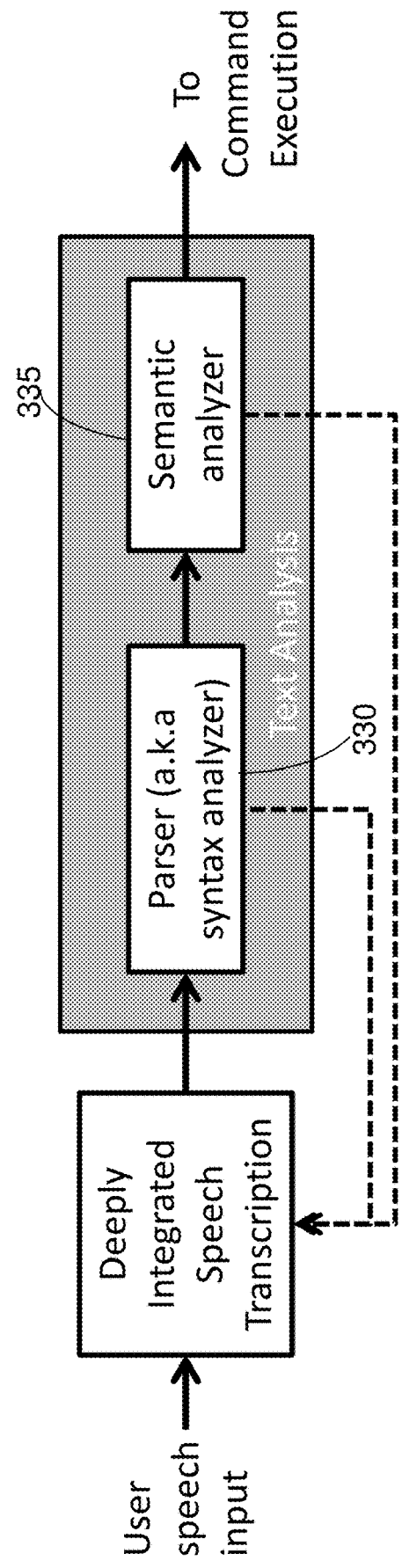
FIG. 3C: Integrated Speech Processing Chain

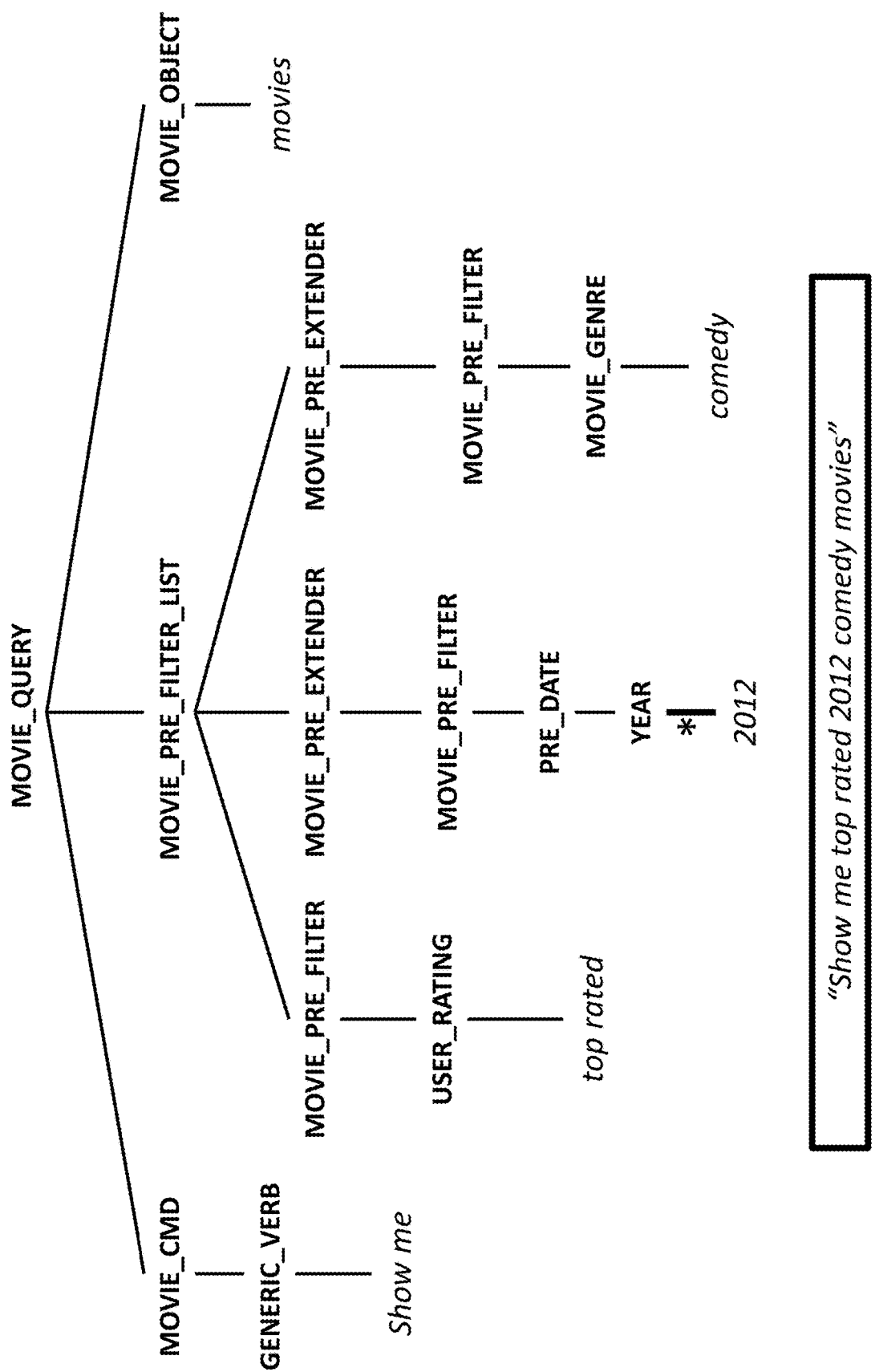
FIG. 4: Parse tree for a sample query

SYSTEM AND METHOD FOR INTERPRETING NATURAL LANGUAGE COMMANDS WITH COMPOUND CRITERIA

RELATED APPLICATIONS

This application is a continuation of U.S. patent application Ser. No. 14/846,714, filed on Sep. 4, 2015, which in turns claims the benefit of Provisional Application No. 62/046,791, filed on Sep. 5, 2014, both of which are hereby incorporated by reference.

TECHNICAL FIELD

The disclosed embodiments relate generally to computer-implemented methods for natural language processing.

BACKGROUND

Many software applications involve users submitting queries for information, or otherwise issuing commands for action. Each particular class of application—hereinafter referred to as a "vertical" or a "domain"—typically has its own way to describe the content of a query or other command to achieve a desired result. For example, in the movie domain, an application might include functionality for searching for movies having certain attributes, such as title, genre, rating, year of release, or actors appearing in the movie. As another example, in the domain of travel, an application might include functionality for hotel accommodations, where the attributes are (for example) hotel location, rating, cost per night, type (e.g., hotel, motel or bed and breakfasts), whether pets are allowed, and the like. The desired attributes may be complex, with multiple compound attributes, such as hotels that are located in Napa, permit pets, have three star ratings or better, are not motels, include meals, and are priced below $100. Different command (e.g., query) formats may thus be appropriate for different domains, or even for different applications within a single domain where it is desired that users be able to express their intents in different manners.

Graphical user interfaces—such as a collection of text fields, checkboxes, selection lists, and the like—may be employed as a means for specifying the attributes of a search command, but such interfaces may consume considerable screen space and require users to exhaustively specify every attribute of interest via the user interface. In many scenarios, such as when working on devices like smart phones that typically lack efficient data entry capabilities, specifying every attribute of interest using a user interface is slow and tedious for users. In other scenarios, such as when using devices with only rudimentary input capabilities, such user interfaces are often infeasible, and alternate methods of data input, such as voice-driven commands, would be greatly preferable.

Thus, a natural language mechanism for specifying a command (e.g., a query)—which could be specified either textually, or with voice converted to text via speech processing—is in many situations a more effective technique. However, interpreting the meaning of natural language is difficult, given that each domain may involve different actions, different types of object with different attributes, different ways of expressing complex properties such as price ranges or result ordering, or the like. Conventional techniques for specifying queries, such as (for example) keyword-based systems, are inadequate for expressing complex queries or other commands.

SUMMARY

A command-processing server receives a natural language command from a user. The command-processing server has a set of domain command interpreters corresponding to different domains in which commands can be expressed, such as the domain of entertainment, or the domain of travel. Some or all of the domain command interpreters recognize user commands having a verbal prefix, an optional pre-filter, an object, and an optional post-filter. The domain command interpreters, and the sub-structure interpreters on which they are based, may be specified by different developers.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 2 shows an exemplary MR for the movie query command "Show me top rated 2012 comedy movies" using the frame representation, according to one embodiment.

FIG. 3A depicts one embodiment of the overall flow in the execution environment of FIG. 1 when responding to a user command specified in textual form, and FIGS. 3B and 3C depict different embodiments of portions of the flow of FIG. 3A. in which the user command is specified in speech form.

FIG. 4 displays the parse tree for an example query command that results from the command execution environment of FIG. 1 parsing the query command according to example rules, according to on embodiment.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
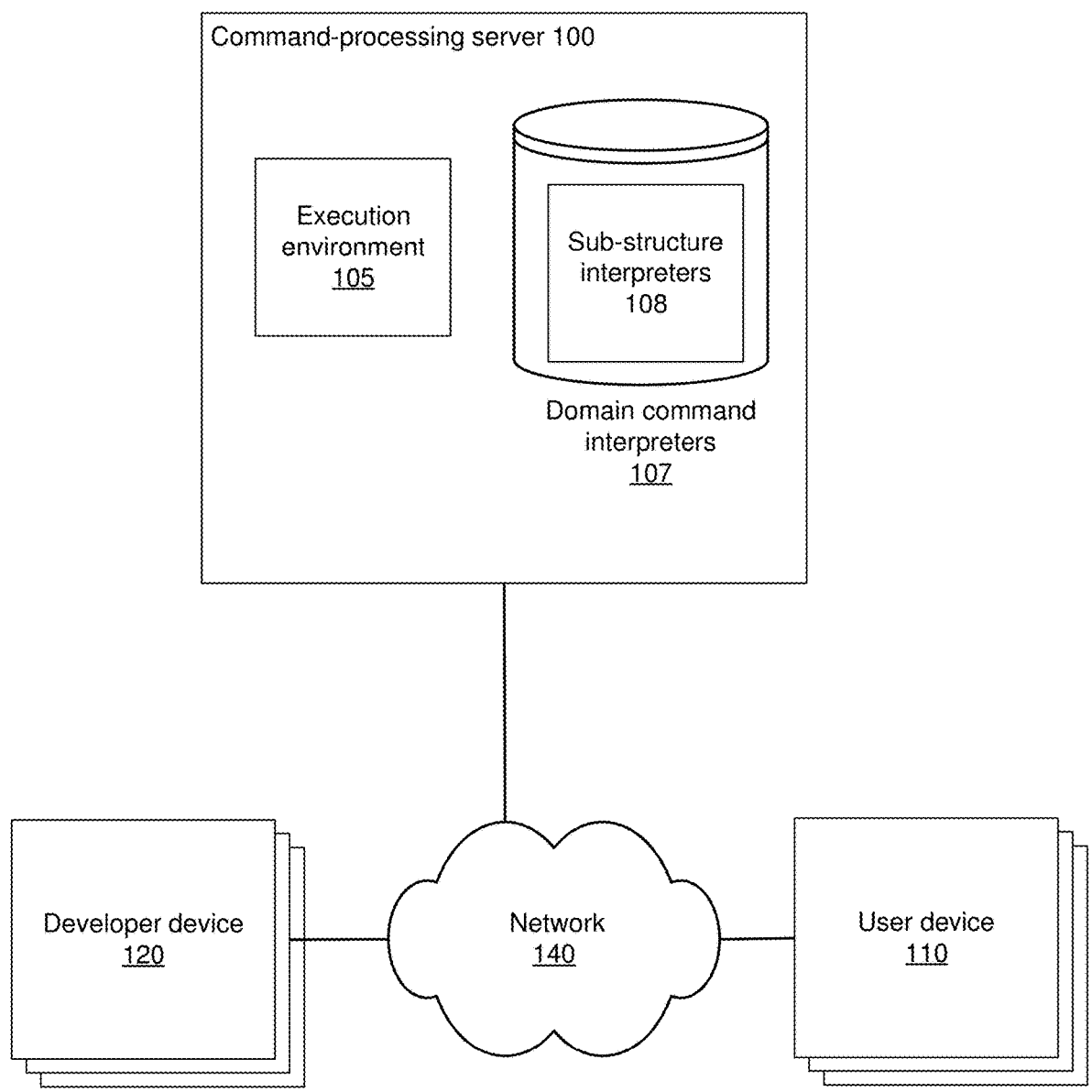
FIG. 1 illustrates a computing environment in which a user command is interpreted, according to one embodiment.

FIG. 1 illustrates a computing environment in which a user command is interpreted, according to one embodiment. A command processing server 100 has a command execution environment 105 that processes commands entered by users on user devices 110, interpreting the commands according to a library of domain command interpreters 107. The domain command interpreters 107 may be created by the owners or operators of the server 100, or they may be created by developers on developer devices 120 and submitted to the command-processing server 100 for storage and execution. In any case, the set of domain command interpreters 107 represent a library of code that can be integrated into applications to interpret user commands from the different domains corresponding to the domain command interpreters in the library. In one embodiment, the domain command interpreters are stored in a source code repository.

The developers 120 include authors of software applications that offer a natural language interface to their functionality. The developers 120 accordingly develop their applications, which may be local applications installed on a user's system (e.g., the user devices 110), or a web-based application deployed on a network-accessible server, for example. The applications developed by the developers include calls to the command-processing server 100 to handle commands entered by the users 110. For example, the calls could send the command as text (e.g., for typed user queries), or as audio (e.g., for user voice commands), to the command-processing server 100 for execution. In one embodiment, as the result of executing the user commands, the command-processing server parses the command and generates a frame (discussed later) that captures the data variables expressed in the command; the calling applications then receive the frames and take the appropriate actions using the data variables of the frames.

The user devices 110 and developer devices 120 are computing devices capable of being used to create domain command interpreters 107, and/or to execute applications through which user commands are specified. The network 140 that connects the devices 110, 120 with the server 100 may be any suitable communications network for data transmission. The network 140 uses standard communications technologies and/or protocols and can include the Internet. In another embodiment, the network 140 includes custom and/or dedicated data communications technologies.

Although FIG. 1 depicts a client-server embodiment in which the server 100 processes queries on behalf of clients, it is appreciated that in other embodiments the processing may all take place within a single computer system. For example, a user device 110 could store domain command interpreters 107 and have a command execution environment 105 that locally interprets the commands specified by a user of the client device.

The command execution environment 105, and the domain command interpreters 107 that it processes, are now discussed in more detail.

In the below, the term "meaning representation" (MR) refers to a formal representation designed to programmatically represent the meaning of the user's command input, and semantic analysis refers to the programmatic process by which a MR is created and assigned to the input. Semantic analysis operates with many goals and constraints. The desired MR should convey the actual (literal) meaning of the query—known as verifiability. The doctrine of canonical form states that inputs with the same meaning should be mapped to the same MR. For example, in the case of a natural language search query into a database (such as the movie search example given previously), the MRs resulting from semantic analysis should be easily and programmatically mapped to low-level database API calls that correctly express the meaning of the user's natural language query.

The command execution environment 105 operates using the principle of compositionality, according to which the meaning of the whole is obtained by combining the meaning of the parts. That is, for every grammar production $L= R_1 R_2 \ldots R_N$, the meaning representation m(L) of the left hand side is computed using a function of $m(R_i) \ldots m(R_n)$ for a selected subset $R_i$, $R_n$ of the right-hand side symbols $R_1 \ldots R_N$, with certain extensions to cover the cases where the right-hand side of a rule involves optional parts [ . . . ] or iteration using one of Kleene's operators * and +. The semantic mapping function m is associated with the rule; it is called the augmentation, or semantic augment, for the rule. Attaching semantic mapping functions to every grammar production rule is called augmenting the grammar. It allows meaning representations to be computed in a bottom-up manner. This can be done in a separate post-pass on the syntax tree, or during parsing—whether the parser is top-down or bottom-up, and incremental or not.

In one embodiment, the command interpretation environment 105 uses frames, also called slot-filler representations, as the meaning representation (MR) format to programmatically represent the meaning of a part of an input expression (e.g., a query from a user). Every frame has a type, which defines the set of variables (equivalently, slots) associated with that frame type. These variables may either be typed (as in C++) or untyped (as in LISP). An instance of a frame of a certain type holds a set of slot-value pairs; each slot may be filled or not. The top-level frame—that is, the frame corresponding to the entire natural language command—can be treated as a data structure representation of the command's meaning. Providing values for the pertinent variables that represent the meaning of the command creates a representation for the one or more actions to be taken to execute the command, or for the one or more information requests to be fulfilled in response to the command.

Many concrete implementations exist for this data structure; they differ in (for example) speed, space, and ease of allocation. For example, one implementation uses a linked list of pairs (where the order of slot-value pairs is not significant); another uses a C/C++ struct or equivalent (in which case there should be a way to tell if a slot is present or not); and another uses one or more hash tables. In one embodiment described in application 61/798,526, filed on Mar. 15, 2013, entitled "An Integrated Programming Framework for Speech and Text Understanding" and incorporated herein by reference, the slots have declarations resembling an argument list, but these are the output parameters of an interpreter rather than input parameter of a regular function. (For example, for the block with signature "public block (string full_address) US_STREET ADDRESS( )", the parameter "full_address" of type "string" is the output value that results in parsing user input.)

FIG. 2 shows an exemplary MR for the movie query command "Show me top rated 2012 comedy movies" using the frame representation, according to one embodiment. The top-level pointer points to Frame 1, which is of type SHOW_RESULTS and has slots what, to_whom, max_number and sort_order. The value of the to_whom slot is the constant USER, which refers to the user who presents the query to the system. The value of the what slot describes the set of results to be examined in response to the query; it specifies this via a pointer to another frame. Frame 2 is of type MOVIE and has the slots movie_genre, user_rating, movie_rating and release_date. The movie_rating slot value (which could be, say, "PG-13") is left unspecified, as in indicated by the fact that it is blank in the figure. In some representations such as a C struct, a special value ANY_RATING can be used for a blank. Similarly, the unspecified maximum number of movies in the answer to the query will also be set eventually to a default value (such as max_number=10) and the unspecified sort order to its own default, such as sort_order=DESCENDING_USER_RATING (not shown in the figure).

FIG. 3A depicts one embodiment of the overall flow in the execution environment 105 when responding to a user command. Input queries from the user may be entered as either speech or text. The examples below describe query commands as text, though they could equivalently have been entered as speech (and converted to text using speech recognition as illustrated in FIGS. 3B and 3C).

The handling of a user command includes a text analysis phase 305 performed by the execution environment 105 using the domain command interpreters 107. The text analysis phase 305 involves parsing 330 and semantic analysis 335 that produces frames representing the meaning of an input command. The handling also includes an action phase 307 that uses the variables of the frames to take an action in response to the command. In one embodiment, the text analysis phase 305 is performed by the execution environment, and the action phase 307 is performed by the code of the application in which the user command was entered, and which called the command-processing server 100, using the frames produced by the execution environment 105. For example, a user could specify a movie query command via a movie application; the movie application could send the query to the command-processing server 100, where the execution environment 105 uses a corresponding domain command interpreter 107 for the movie domain to interpret the query and produce frames representing the meaning of the query (e.g., the criteria describing attributes of the movies to find, the order in which to sort the results, etc.); and the application could use the data variables in the resulting frames to execute the query (e.g., to issue a query to a movie database using the variables). In other embodiments, the action phase 307 can be performed as part of the actions of the execution environment 105. Referring to the preceding example, the domain command interpreter 107 for the movie domain could itself assemble and submit the query to the movie database, rather than merely constructing the frames that represent the meaning of the query command.

The users 110 may submit commands to the command-processing server 100 as speech/voice or as text. The below presents example commands in the form of text, though it is appreciated that the commands could also be submitted as speech and converted to text. (For example, the speech could be completely converted to text in a single pass, and then the converted text parsed and analyzed, as in the modular speech processing chain of FIG. 3B. Alternatively, speech-to-text and textual analysis operations could be interleaved as illustrated in FIG. 3C, which the results of text analysis influencing how speech is converted to text.). The following are example query commands taken from the hotel, clothing, automobile, music, movies and restaurant domains:

Find a cheap Chinese or Japanese open late tomorrow

Top rated comedies that are not rated R and feature Bruce Willis and Jennifer Aniston I want to buy a pink ski hat between $20 and $30 that is available in stock with 2 day shipping Find me used cars no more than 3 years old colors black or white or blue exclude foreign but include Toyota and Hyundai I need rap or hip hop songs that were released in the last 2 years and that reached the top charts but nothing with Eminem or Kanye West Show me up to three pet friendly five star hotels in Napa for this weekend for less than $300 per night sorted by lowest price but nothing below $100 and also exclude motels and bed and breakfast Commands such as these are too complex for traditional keyword-based systems, and are also too complex for statistical language models. The command-processing server 100 employs a grammar-based approach, appropriately augmented by semantics, to render command interpretation feasible. The challenge is to reliably parse and interpret complex commands without unduly restricting the user's natural expression.

Development Tools

The below describes the operations of the command-processing server 100 in terms a grammar-based development framework of sufficient power to support parsing and interpretation of complex natural language queries. One embodiment of such a command-processing server is described in U.S. Application No. 61/798,526 filed on Mar. 15, 2013, entitled An Integrated Programming Framework for Speech and Text Understanding, and incorporated herein by reference, and referred to herein as Terrier. In the following, the code examples will be provided using the Terrier programming language, which provides a way to describe a context-free syntax augmented by C++ semantics.

However, it is appreciated that use of the Terrier language and system per se is not a requirement. Rather, one of skill in the art could design and employ alternative frameworks for parsing and interpretation, such as those based on different programming languages, those that have different APIs or methodologies, or the like.

Overview

In addition to employing natural language tools built using of a general programming language (such as, e.g., C++ in the Terrier embodiment), the command-processing server 100 breaks down the parsing and interpretation problem for a complex search query, in order to give users flexibility of expression, while rejecting ill-formed queries, and to create an internal frame-based representation of every valid query. Grammar examples are given using extended BNF notation (EBNF) defined informally below and more formally in Appendix 1. Code examples, as mentioned earlier, are specified in the Terrier programming language.

Grammar Development

In one embodiment, a command handled by the command-processing server 100 matches a pattern that comprises an optional verbal prefix expressing a request, followed by an object (e.g., a type of product or service or information) on which the verbal prefix acts and that is qualified by one or more filters that express criteria for attributes of the object. The verbal prefix may be a verb, such as "tell me", "show me", "give me", "list", "what is" or the like, or a verb-oriented phrase such as "Do you recommend" (e.g., in "Do you recommend any pet-friendly hotels near here?"). The verb may also be absent, in which case it is equivalent to an implicit information query such as a "find" (in a data base) or a "search" (on the web). The selection filters are terms or clauses that, in case of a search, narrow the set of answers, and for an action verb, narrow the field of application of the verb. Filters that appear before the object in a natural language command are called pre-filters; filters that appear after the object in the natural language command are post-filters. The top-level grammar rule for the commands is of the form:

(1)  COMMAND=[VERBAL_PREFIX] .PRE_FILTER*.OBJECT.POST_FILTER*

The above grammar is expressed using a variant of Extended Backus-Naur Form (EBNF), where expressions in square brackets are optional, the star "*" denotes Kleene's postfix operator that allows repetition zero or more times, and the period "." is the concatenation operator; concatenation is implicit, and the "." may be omitted as long as there is a space between any two symbols, although "." is used explicitly in the examples herein for ease of reading. White space is also optional, and used for enhancing readability. Appendix 1 provides the full details of the grammar notation.

Commands are issued for different purposes, also called user intents, and accordingly represent different domains. Query commands to search for a hotel or a used car represent different user intents/domains. The intent of a query is determined while parsing, and the interpretation of the query will occur in the corresponding domain (vertical).

Although a command that is valid (i.e., interpretable) in one domain will typically not be valid in a different domain, different domains can share sublanguages and structure. For example, common words or expressions, such as cheap or comfortable or highly rated may be shared between verticals. As another example, the automobile query "Find a Honda dealer in San Francisco open after 9 pm tonight" and the restaurant query "Is there a quiet Chinese near here open after 9 pm tonight?" share the business hours criterion, "open after 9 pm tonight". Having common grammatical sub-structures across different domains can be advantageous, in that it allows a single grammatical sub-structure processor to be shared among multiple domains with commands that may be expressed using that sub-structure. Thus, in one embodiment, the domain command interpreters 107 include grammatical sub-structure interpreters 108 created by those responsible for the command-processing server 100, or by developers, that are used within domain command interpreters 107 created by a different entity (e.g., another developer 120). (The sub-structure interpreters 108 may be implemented in the same way as the domain command interpreters 107 and may likewise be referred to as domain command interpreters.) That is, the various domain command interpreters 107 may use various sub-structure interpreters 108 to interpret portions of commands that are common across multiple domains. The sub-structure interpreters 108, like the domain command interpreters 107, may be developed by different developers, and a given domain command interpreter 107 may use sub-structure interpreters 108 developed by a plurality of different developers.

Grammar Templates

Commands from different domains use grammars that are not identical, despite the fact that some domains may share some grammatical sub-structures. Accordingly, the generic Eq. 1, above, may be specialized for each domain. Consider the rule template of Eq. 2, below, where the domain D is a meta-variable:
(2)     <D>QUERY=[<D>VERBAL_PREFIX].<D> PRE_FILTER*.<D>OBJECT.<D>POST_FILTER*

In this notation, the angle brackets are used as meta-symbols to delimit the name of a variable domain. For example, if D=HOTEL_were chosen for the "hotel" domain, then the symbol templates <D>QUERY and <D>OBJECT will turn into plain grammar symbols HOTEL_QUERY and HOTEL_OBJECT. This simple template device allows the discussion to apply to different domain variants. The templates conceptually represent the commonality of different domain commands, and how the author of a domain command interpreter 107 could use patterns similar to that in other domains; they are used here to simplify the discussion, but are not implemented by the execution environment 105 itself. The grammar for the domain command interpreters 107 may be modified to highlight the fact that filters are optional lists. This does not change the language itself; the grammar is equivalent.
(3)     <D>QUERY=[<D>VERBAL_PREFIX]. [<D>PRE_FILTER_LIST].<D>OBJECT. [<D>POST_FILTERLIST]
(4)     <D>PRE_FILTER_LIST=<D>PRE_FILTER. <D>PRE_FILTER*
(5)     <D>POST_FILTER_LIST=<D>POST_ FILTER.<D>POST_FILTER*

In order to support the natural compounding of multiple criteria, a broader class of "joiner" phrases that includes conjunctions is added to the generic grammars of Eq. 3-5. Using a vertical bar "|" to express alternation, we can express a domain-independent sub-structure interpreter 108 such as:
(6) JOINER=and |or |with |plus|as well as |in addition to|but also I and also|yet Since in English, conjunctions may be either explicit or implicit ("syndetic" vs. "asyndetic" style), the use of a joiner is optional. Using parentheses for grouping, a generic grammar involving optional conjunctions may be expressed as follows:
(7)     <D>QUERY=[<D>VERBAL_PREFIX]. [<D>PRE_FILTER_LIST].<D>OBJECT. [<D>POST_FILTERLIST]
(8)     <D>PRE_FILTER_LIST=<D>PRE_FILTER. (|JOINER].<D>PRE_FILTER)*
(9)     <D>POST_FILTER_LIST=<D>POST_FILTER ([JOINER].<D>POST_FILTER)*

The generic grammar may be further modified by breaking up rules into smaller steps:
(10)    <D>QUERY=[<D>VERBAL_PREFIX]. [<D>PRE_FILTER_LIST].<D>OBJECT. [<D>POST_FILTER_LIST]
(11)    <D>PRE_FILTER_LIST=<D>PRE_FILTER.<D> PRE_EXTENDER*
(12) <D>PRE_EXTENDER=[JOINER].<D>PRE_FILTER
(13) <D>POST_FILTER_LIST=<D>POST_FILTER.<D> POST_EXTENDER*
(14)    <D>POST_EXTENDER=[JOINER] .<D>POST_FILTER The examples presented below use one of the generic grammars listed above, or close variants thereof. These various generic grammars, when made concrete by replacing the "<D>" metavariable with an identifier of a specific domain, can be used to handle domain-specific queries that comprise an optional command, zero or more pre-filters, an object, and zero or more post-filters. This grammar template covers a broad range of queries, from trivial to very complex, depending on the number and nature of pre- or post-filters.

Domain-Specific Grammar Rules

Given the above high-level structure or "skeleton" of a grammar for commands, the below illustrates more concrete grammars with specific concepts and terminology for the different possible domains. (The grammars are then implemented with corresponding domain command interpreters 107, as explained in more detail below.) A domain-specific grammar provides concrete definitions for the following template symbols, which are discussed one after the other:
(15)    <D>QUERY=[<D>VERBAL_PREFIX] .<D>PRE_FILTER*.<D>OBJECT.<D>POST_FILTER*
(16) <D>VERBAL_PREFIX=GENERIC_VERB_PREFIX <D>VERB
(17) <D>VERB AL_PREFIX= . . .
(18) <D>OBJECT= . . .

(19) <D>PRE_FILTER= . . .
(20) <D>POST_FILTER= . . .

Many commands may share domain-independent command options (which are implemented with corresponding sub-structure interpreters 108), such as:
(21) GENERIC_VERB_PREFIX=I want to |I wish to|help me [to]| . . .
or The <D>CMD grammar may include domain-specific action commands in addition to generic commands. Examples are:
(22) MUSIC_VERB=[GENERIC_VERB_PREFIX [hear|listen to]
(23) MOVIE_VERB=[GENERIC_VERB_PREFIX] watch
(24) <PRODUCT>CMD=[GENERIC_VERB_PREFIX] buy The use of words like hear or listen to above is recognized by the MUSIC domain, which sets up a command structure aimed at music results. Similarly, watch is recognized by the domain command interpreters 107 for the MOVIE domain, in response to which the command execution environment 105 creates a movie search command. For the last rule above, the word buy calls for objects that can be sold; but since the choice of the PRODUCT domain remains open, product type information will be needed to choose a specific domain.

Regarding grammar rules for vertical-specific objects (<D>OBJECT), note that the same word may fill the role of an object or that of a pre-filter. For example, the word Chinese acts as a pre-filter in the query command "find a Chinese restaurant nearby" but as an object in "find a Chinese nearby". In the latter case, the word "Chinese" is interpreted the same way as "Chinese restaurant" and in particular it has the effect of triggering a restaurant search interpretation—possibly along with other interpretations.

The respective grammars for pre-filter <D>PRE_FILTER and post-filter <D>POST_FILTER are responsible for introducing the bulk of the domain-specific terms and phrases, using as many different rules as needed to express the needed criteria. Pre-filters (the selection terms that precede the object) are typically adjectives or adjectival phrases, while post-filters can be much more complex. In either case, the command becomes domain-specific at this point. Many grammar patterns are shared between domains, but they are no longer as simple as a template to be instantiated. Thus it is time to turn to a domain-specific example.

Examples from a MOVIE Domain

Sample movie query commands listed below focus on pre-filters; a corresponding MOVIE_PRE_FILTER domain command interpreter 107 for implementing a grammar that recognizes the query commands is introduced after. Example queries include:
  Show me a list of movies (no pre-filter)
  Show me comedy movies (1 pre-filter: "comedy")
  Find top rated comedy movies (2 pre-filters: "top rated", "comedy")
  Show me top rated 2012 comedy movies (3 pre-filters: "top rated", "2012", "comedy")
  R rated comedies (1 pre-filter: "R rated")

The last example has no command (the <D>VERBAL_PREFIX is optional in the above) and just one pre-filter; observe that comedy or comedies are treated as a pre-filter in the preceding examples, but as an object in the last example, based on the knowledge that a comedy is a kind of movie. This type of relation among categories may be accessed from a taxonomy or ontology, or built directly into the grammar, as is done in these examples.

Note that when the comedy category is treated as a subset of the movie category, this ignores theater. However, in the alternatives there would simply be two lexical meanings for the word "comedy"—the movie comedy and the theater comedy—and both of them would be candidates in the processing.

The following are example rules for pre-filters in the MOVIE domain. Filter rules are used to distinguish four attributes in the pre-filters:
(25) MOVIE_PRE_FILTER= MOVIE_GENRE|USER_RATING|MOVIE_RATING|PRE_DATE More concrete values are also defined for the four attributes, some of which are listed below:
(26) MOVIE_GENRE="comedy"|"horror"|"action"| . . .
(27) USER_RATING="top rated"|DIGIT "star"| . . .
(28) MOVIE_RATING="rated R"| . . .
(29) PRE_DATE="recent"|YEAR| . . .
MOVIE_OBJECT could be defined as follows:
(30) MOVIE_OBJECT="movie"|"movies"|"comedy"| "comedy"| . . .

The above defines a grammar for the MOVIE_QUERY domain that is sufficient to parse the query command "Show me top rated 2012 comedy movies". The high-level portion of the grammar is obtained by replacing the template variable <D> with the value MOVIE_in Eq. 2, above. The instantiated rules that are used in the example are:
(31) MOVIE_QUERY=[MOVIE_CMD].[MOVIE_PRE_FILTER_LIST].MOVIE_OBJECT.[MOVIE_POST_FILTER_LIST]
(32) MOVIE_PRE_FILTER_LIST=MOVIE_PRE_FILTER.MOVIE_PRE_EXTENDER*
(33) MOVIE_PRE_EXTENDER=[JOINER].MOVIE_PRE_FILTER
(34) MOVIE_CMD=GENERIC_VERB The rest of the grammar rules required are either generic (such as GENERIC_VERB) or one of the movie-specific rules above.

FIG. 4 displays the parse tree for the query command "Show me top rated 2012 comedy movies" which results from the command execution environment 105 parsing the query command according to these rules. Note that the iteration in MOVIE_PRE_EXTENDER* is carried out twice, and that MOVIE_PRE_FILTER is present three times. Also, the optional post-filter list is absent.

Post-filters may be defined in the same manner as pre-filters, but are in most cases more complex than pre-filters and so typically require more rules to define. One example definition of a post-filter (TW_POST_FILTER) is included in Appendix 2, below.

In summary, the foregoing has demonstrated how generic rules, template rules and domain-specific rules can combine into domain-specific grammars for compounding multiple attributes in a command. This foundation will now be used to address command interpretation, also called semantic analysis, when executing the domain command interpreters 107 that implement the grammars for commands in a particular domain.

Semantic Analysis

In one embodiment, the command execution environment 105 interprets a command in a bottom-up, frame-filling manner in order to construct a meaning representation (MR) for a given query. More specifically, different components representing parts of a query are associated with a grammatical expression that determines whether the component is matched and with a set (zero or more) of output variables that represent the values constituting the meaning of the portion of the command that matched. This is accomplished by attempting to match a command against (i.e., interpret with) the various domain command interpreters 107, which may be structured in different ways, as the developer 120 or other creator of the domain command interpreter sees fit. One common technique for structuring the output of a domain command interpreter 107 is to instantiate a frame data structure for each occurrence of a non-terminal symbol in a parse tree according to a grammar describing the domain; the meaning of each instance of the non-terminal symbol in a parse tree is represented by the "output variables" stored as slot values for the frame. A domain command interpreter 107 may thus be represented using multiple sub-structure interpreters 108 for that domain, e.g., one sub-structure interpreter for each non-terminal symbol in the grammar, and the parser-interpreter generates a parse tree with an output frame associated with each node of the tree.

As a more concrete example, Appendix 2 below lists a grammar that includes the non-terminal TW_PRE_FILTER, defined as:

TW_PRE_FILTER
=LANGUAGE.[language]
=MAP_LOCATION.[area|region]

Using an execution environment 105 for the "Terrier" language, a sub-structure interpreter 108 for TW_PRE_FILTER can be implemented using the following code block from Appendix 4:

```
static block (string language_name, string language_code,
  DateTimeRangeSpec datetime_range_spec, MapLocationSpec
    location_spec) TW_PRE_FILTER( ) {
  interpret {n_language=LANGUAGE( ).[1/50 "language"] } as {
    language_name=n_language->language_name;
    language_code=n_language->iso_code;
  }
  interpret {n_location=MAP_LOCATION( ).[1/10 ("area"|"region")]} as {
    location_spec=n_location->location;
  }
}
```

Thus, the meaning of the TW_PRE_FILTER is defined by the output variables "language_name" (of type "string"), "language_code" (of type "string"), "datetime_range_spec" (of type "DateTimeRangeSpec"), and "location_spec" (of type "MapLocationSpec"), which correspond to the LANGUAGE and MAP_LOCATION non-terminals in the grammar for TW_PRE_FILTER. The two "interpret" blocks define how values are to be mapped (equivalently, how meaning is to be assigned) to the block output variables. For example, the first interpret block indicates that if the LANGUAGE block (followed by an optional "language" literal) is matched, then the frame output variable "language_name" is set to the "language_name" property of "n_language" (which in turn is the frame representing the meaning of the LANGUAGE block).

The semantic analysis performed by the command execution environment 105 can be described as operating in a bottom-up manner when responding to a command, in that the execution environment attempts to recursively match each sub-structure interpreter 108 until no more sub-structure interpreters are present in the command being responded to. Referring to the example above, when attempting to match the sub-structure interpreter 108 for TW_PRE_FILTER, the command execution environment 105 first attempts to match the LANGUAGE or MAP_LOCATION sub-structures interpreters 108 before it completes a match of TW_PRE_FILTER. The bottom-up processing order is illustrated in FIG. 4, in which the sub-structure interpreter 108 for MOVIE_PRE_FILTER_LIST is matched by first matching that for MOVIE_PRE_FILTER, which in turn involves first matching that for USER_RATING, and so forth.

Figure 5:
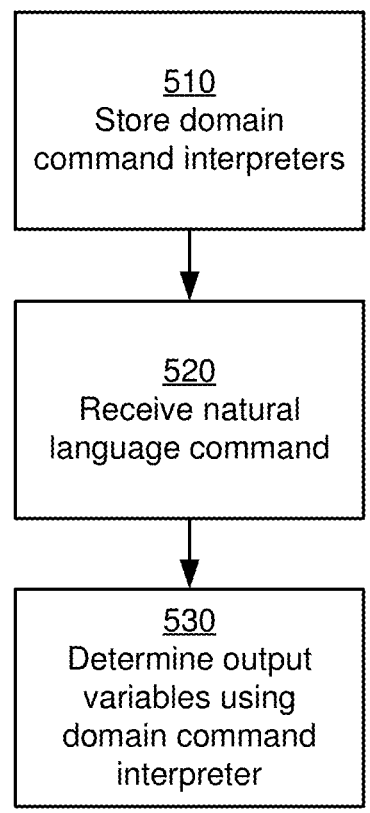
FIG. 5 is a flowchart illustrating actions performed by the command-processing server FIG. 1 when interpreting a natural language command, according to one embodiment.

FIG. 5 is a flowchart illustrating actions performed by the command-processing server 100 when interpreting a natural language command, according to one embodiment.

The command-processing server 100 accesses 510 a library of domain command interpreters 107. The library of domain command interpreters 107 that is accessed may be stored locally on the command-processing server, or may be accessed over the network 140. Each of the domain command interpreters 107 produces a set of output variables in response to interpreting natural language commands. A plurality of the domain command interpreters 107 interpret commands in a corresponding domain according to a <verbal prefix> <pre-filter><object> <post-filter>pattern defined by the domain command interpreter 107, where either the pre-filter or the post-filter is specified by the pattern but need not be matched in a natural language command in order for the natural language command to be successfully interpreted (that is, they could be empty in the natural language command). For example, in expression (31) above-namely, MOVIE_QUERY=[MOVIE_CMD].[MOVIE_PRE_FILTER_LIST].MOVIE_OBJECT.[MOVIE_POST_FILTER_LIST]—both MOVIE_PRE_FILTER_LIST and MOVIE_POST_FILTER_LIST are specified (in that they are part of the expression definition) but are optional, as indicated by their surrounding square brackets. Thus, for example, the expression (31)—as appropriately supplemented by sub-expressions for its constituent elements MOVIE_CMD, MOVIE_PRE_FILTER_LIST, MOVIE_OBJECT, and MOVIE_POST_FILTER_LIST—could interpret both the expression "Show me a list of movies" (which includes the MOVIE_CMD "Show me" and the MOVIE_OBJECT "A list of movies", but not a MOVIE_PRE_FILTER_LIST or a MOVIE_POST_FILTER_LIST) and the expression "Show me comedy movies" (which includes the MOVIE_PRE_FILTER_LIST value "comedy"). Similarly, the pre-filter and post-filter need not recognize only a single (atomic) instance of a filter, but rather may recognize expressions that combine multiple filters, such as conjunctions, disjunctions, or negations of simpler filters in diverse forms. For example, the query "movies starring Javier Bardem but not Penelope Cruz, released after 2003 and also excluding any from the Coen Brothers", contains the two positive post-filters "starring Javier Bardem" and "released after 2003" separated by a comma, acting as an implicit "and", and two negative post-filters, "not (starring) Penelope Cruz" introduced by the conjunction "but" and "excluding any from the Coen Brothers" introduced by an "and also". In this query, the words "but", "and" and "also" could have been omitted without altering the meaning of the query. Generally, the syntax for the <verbal prefix> <pre-filter> <object> <post-filter>patterns, and notably the compounded filter patterns, will be to accept and interpret explicit conjunctions and even "noise words" such as "also" here, as well as supply implicit conjunctions in the absence of explicit ones. Some domain command interpreters 107 will not require the <verbal prefix> to be present in a natural language command in order for it to be matched. For example, the MOVIE_CMD of expression (31) above is shown in square brackets to denote that the verbal prefix is optional (e.g., a user could simply specify the natural language command "comedy movies", and a verbal prefix such as "show me" would be implied). The specifics for the verbal prefix, pre-filter, object, and post-filter need not be specified directly in the domain command interpreter 107 itself, but may rather be specified in sub-structure interpreters 108. For example, a domain command interpreter for the MOVIE_QUERY of expression (31) above need not specify the details of the MOVIE_PRE_FILTER_LIST, but rather may use a separate sub-structure interpreter 108 to define the details of the pattern that the MOVIE_PRE_FILTER_LIST requires.

The command-processing server 100 also receives 520 a natural language command from an application executing on a client device located remotely from the command-processing server, the natural language command comprising a plurality of filters expressing criteria of the command. For example, an application that supports at least the movie domain—such as an application dedicated to movies and entertainment, or a virtual assistant application that supports queries for movies in addition to other types of queries—is one example of an application. The application could execute directly on a user device (e.g., as an app or virtual assistant for a smartphone), or on a separate host server of a developer that developed the application, for example. The natural language command could be specified directly as text, or as speech convertible to text as illustrated in FIGS. 3B and 3C. The natural language command received in FIG. 5 comprises a plurality of filters, e.g., sub-expressions interpretable as a MOVIE_PRE_FILTER_LIST or a MOVIE_POST_FILTER_LIST.

The command-processing server 100 determines 530, for the natural language command, a set of output variables corresponding to a first one of the plurality of the domain command interpreters by interpreting the natural language command according to the first one of the plurality of the domain command interpreters. For example, the execution environment 105 of the command-processing server 100 could attempt to parse the natural language command using each interpreter from its library of domain command interpreters 107, selecting the interpreter that provides the "best" match (i.e., the interpreter that both can interpret the expression, and also produces a high score for the interpretation). Continuing the above example, the execution environment 105 could determine that a domain command interpreter 107 corresponding to the MOVIE_QUERY of expression (31) above provides the best match for the received expression. The set of output variables is the set defined by the domain command interpreter 107 determined to constitute the best match. E.g., for the TW_PRE_FILTER block above, which implements a domain command interpreter 107, the output variables are the string "language_name" and "language_code", the variable "datetime_range_spec" of type DateTimeRangeSpec, and the variable "location_spec" of type MapLocationSpec.

The domain command interpreter 107 need not only produce a set of output variables as a result of successfully interpreting a natural language expression. For example, the domain command interpreter 107 may take any number of actions as specified by code implementing the domain command interpreter, such as creating a database entry, sending values of the output variables to the application in which the user specified the natural language command for execution, or the like. For example, when the natural language query shown in FIG. 4 is parsed and successfully interpreted, the output variables that represents the meaning of the query might be regrouped in a frame structure as follows, and then sent to the application from which the query was received:

(CommandFrame
  (Command_Kind=Movies_Command)
  (User_Rating=Top_Rated)
  (Movie_Year=2012)
  (Movie_Genre=Comedy)
)

This meaning representation is a data structure that encodes the user's request for an information retrieval action or other type of action; the action may then be "executed" by the application by using the output variables to accomplish the domain-specific goal of the application, such as using the output data structure to derive and execute one or more data base accesses (the details of which depend upon the available databases), which then return answers that the application presents to the user in a suitable format. Alternatively, entities other than the application itself may execute the action. For example, the action may be executed by some or all of the domain command interpreter 107 that produced the output variables, by an external API, by a separate application server, by a user/client device 110, or by any combination thereof.

Figure 6:
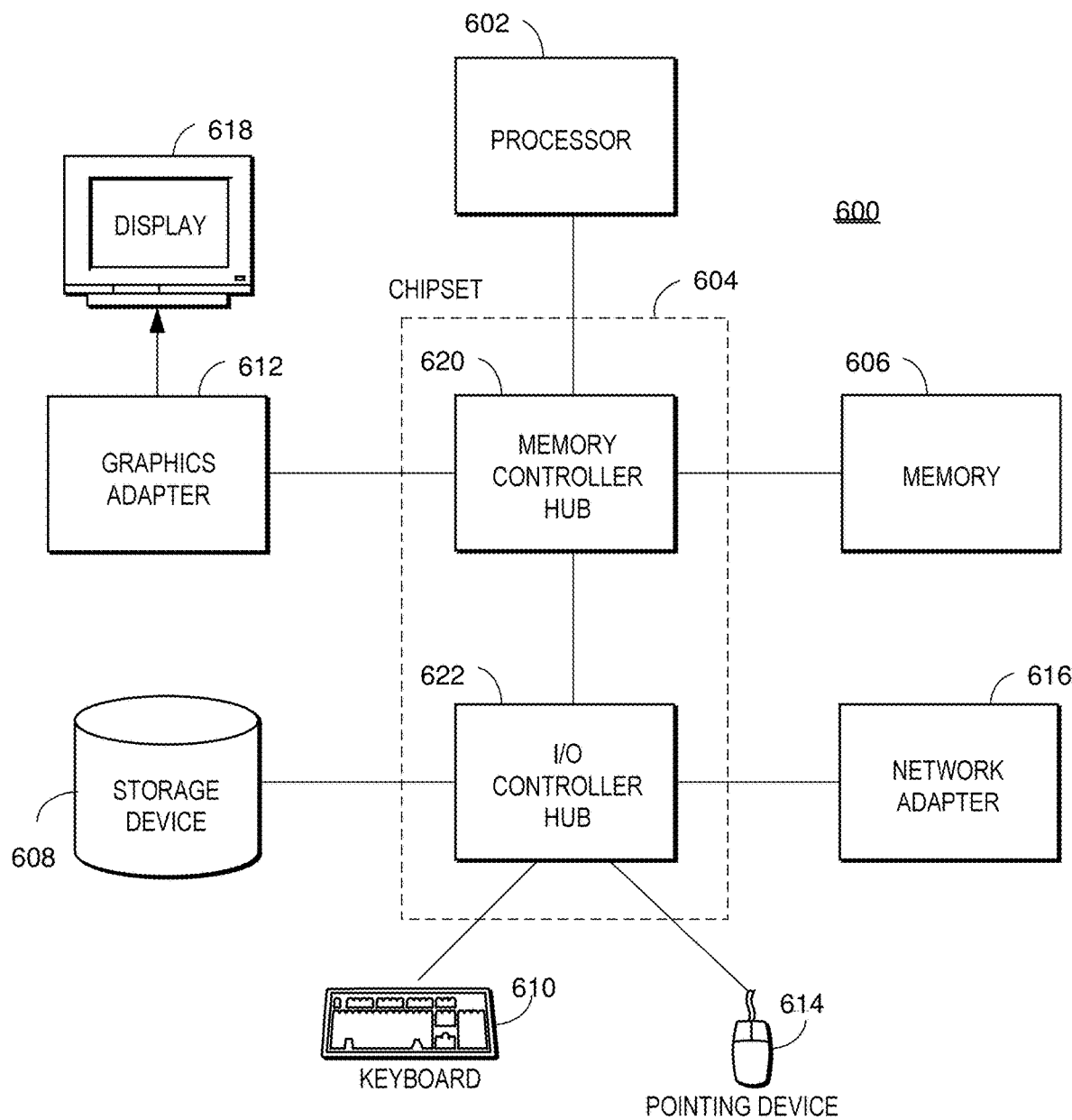
FIG. 6 is a high-level block diagram illustrating physical components of a computer used as part or all of the command-processing server or clients from FIG. 1, according to one embodiment.

FIG. 6 is a high-level block diagram illustrating physical components of a computer 600 used as part or all of the command-processing server 100 or clients 110, 120 from FIG. 1, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

APPENDIX 1: EXTENDED BNF NOTATION

This Appendix describes the notation used in this document for context-free grammar examples. The notation used is one of many conceptually similar or equivalent variants of Extended Backus-Naur Form. The choice of our particular notation was guided by two objectives: (1) simplicity, specifically the readability by human readers; and (2) the existence of a simple mapping from Terrier patterns to our notation; this mapping is described in Appendix 3.

The conventions and meta-syntax for our EBNF notation are as follows. The meta-symbols include the left and right brackets, the left and right parentheses, the dot "." for concatenation, the vertical bar "1" for alternation, the star "*" for Kleene's iteration, the equal sign "=" for definition (starting a production rule) and regular parentheses for grouping. Non-terminal symbols may be written using only uppercase letters and the underscore "_". Terminal symbols may be written using only lower-case letters, or certain special symbols (including the single quote "", which is sufficient here, but none of the meta-symbols just listed. White space is generally ignored.

Production rules have a left hand side which is a non-terminal, and one or more right hand sides, each of which starts after a new "=".Formally, the right hand side of a production must be a valid expression over symbols and meta-symbols. A grammar symbol (a terminal or non-terminal) is a valid expression. Other valid expressions are defined recursively as follows. If E and F are valid expressions, their concatenation "E. F" and their alternation "E|F" are also valid; so are the optional expression "[E]" (which recognizes E or the empty string) and the repetition "E*" (Kleene's * operator recognizes E zero or more times). Parentheses "(E)" may be used for grouping.

APPENDIX 2: GRAMMAR FOR A TWITTER SEARCH APPLICATION

This Appendix illustrates a grammar used to recognize TWITTER SEARCH queries. The grammar below depends on externally defined symbols, including INTEGER_COUNT, MAP_LOCATION, AT_MAP_LOCATION, DATE_TIME_RANGE_PAST, WIKIPEDIA and LANGUAGE, which are assumed to be found in a library of auxiliary definitions.

```
TW_PRE_FILTER_LIST
=[[up         to].INTEGER_COUNT].TW_PRE_FILTER.
(TW_PRE_EXTENDER)*
=[up to].INTEGER_COUNT
TW_PRE_FILTER
=LANGUAGE.[language]
=MAP_LOCATION.[area|region]
TW_PRE_EXTENDER
=[JOINER].TW_PRE_FILTER
=MAP_LOCATION.[area|region]
TW_POST_FILTER_LIST=TW_POST_FILTER.
(TW_POST_EXTENDER)*
TW_POST_FILTER
=([written|posted].in.(LANGUAGE (the.LANGUAGE.language)))
=(([(written|posted)].AT_MAP_LOCATION.MAP_LOCATION)
    |([[(written|posted)].AT_MAP_LOCATION.the.MAP_LOCATION.[(area region)]]))
=[(written|posted)].[from].DATE_TIME_RANGE_PAST
=[(written|posted)].(ABOUT|for|on|with).[hashtag].WIKIPEDIA)
TW_POST_EXTENDER=[JOINER].TW_POST_FILTER
TW_SEARCH=(twitter|([TELL_ME].[A_LIST_OF].
[TW_PRE_FILTER_LIST].(tweets|tweet))).[TW_POST_FILTER_LIST]
```

APPENDIX 3. MAPPING BETWEEN TERRIER CODE AND EBNF

This section is useful for understanding the Terrier code presented above. It is not a requirement of implementing the system, but rather is one means of implementing the domain command interpreters 107.

The overall structure of a Terrier program is:
QUALIFIERS VARIABLES block BLOCKNAME( ) {
    interpret {pattern1} as {code1;}
    . . .
    interpret {patternN} as {codeN;}
}

The Terrier code above, once deprived of its semantic component, translates to the simplified form below, which is further modified to yield the EBNF we are displaying:
BLOCKNAME
=pattern1
. . .
=patternN There are differences, listed below, between the Terrier code and corresponding EBNF. These differences were introduced to make the EBNF more compact, and as easy to read as possible; it serves as in introduction to reading the full Terrier code.

Structure mapping rules: Terrier block headers are omitted; interpret symbol are replaced by an equal symbol "="; all semantics (the as symbol and the following code blocks) are omitted; and the parentheses after a Terrier block invocation are omitted as well;

Terrier patterns use weights, but for simplicity they are not displayed in the EBNF;

Also not displayed in the EBNF, for simplicity, are the pattern variables used in Terrier patterns;

After all the simplifications above, a general cleanup, that notably includes removing extra parentheses, is performed.

Other than these modifications, the EBNF grammars and Terrier code should be in one-to-one correspondence. This would allow the interested reader to use the EBNF as an index into (and partial documentation for) the corresponding Terrier blocks.

APPENDIX 4. TERRIER CODE FOR A TWITTER SEARCH APPLICATION

In one embodiment, a developer application users a domain command interpreter 107 to provide users with a natural language access to tweet searching. Specifically, the developer application converts natural language tweet search queries to API calls to the Twitter search developer API, then receives the results and displays them back to the user. It is a thin layer around the external API functionality, but the use of a natural language interface still gives considerable opportunity to exploit the richer expression of a style of communication that is natural to humans.

The code excerpts below include, from outer to inner:
the TWITTER_COMMAND( ) block, which builds a TwitterCommand data structure whenever a user's query has been successfully parsed; and
the TWITTER_SEARCH( ) block, which attempts to parse a user tweet search query.

The information parameters communicated between TWITTER_COMMAND( ) and TWITTER_SEARCH( ) calls include a search query string, and optional filters including a time range for the search, a location of origin of the tweet, a language_name and/or ISO language_code, and the number of results desired.

Executing the TwitterCommand results in a call to the Twitter Search Developer's API, which performs the actual work; see https://dev.twitter.com/docs/api/1.1. The code required to issue the API call and to format the results for the user need not be shown here. Note that all code below is subject to copyright.

The Terrier code now follows:

```
extern block(CommandHandle command) TWITTER _COMMAND( ) {
    interpret { n=TWITTER_SEARCH( ) } as {
        command = new TwitterCommand(n->search_query, n->datetime_range_spec,
                                      n->location_spec, n->num_results,
                                      n->language_name, n->language_code);
}};
static block (string language_name, string language_code, DateTimeRangeSpec datetime_range_spec, int
num_results=-1, MapLocationSpec location_spec) TW_PRE_FILTER_LIST( ) {
    interpret { [1/100 [1/100 "up to"] . n_num=INTEGER_COUNT( )] . n=TW_PRE_FILTER( ) .
    n_pre=(1/50 TW_PRE_EXTENDER( ))* } as {
        language_name="";
        language_code="";
    // count
    if(n_num) {
        if(n_num->count0 && n_num->count<=100){
```

```
                num_results=n_num->count;
            }
            else {claimed
                num_results=100;
            }
        }
    }
// initial language
    if(n) {
        if(n->language_name != "") {
            language_name = n->language_name;
            language_code = n->language_code;
        }
// location
        if(n->location_spec.isSet( )) {
            location_spec = n->location_spec;
        }
    }
// language pre-filters
    if(n_pre) {
        if(n_pre->language_name != "") {
            language_name = n_pre->language_name;
            language_code = n_pre->language_code;
        }
// location pre-filters
        if(n_pre->location_spec.isSet( )) {
            location_spec = n_pre->location_spec;
        }
    }
}
    interpret { 1/100 [1/100 "up to"] . n_num=INTEGER_COUNT( ) } as {
        language_name="";
        language_code="";
// count
        if(n_num) {
            if(n_num->count>0 && n_num->count<=100){
                num_results = n_num->count;
            }
            else {
                num_results = 100;
            }
        }
    }
}
static block (string language_name, string language_code, DateTimeRangeSpec datetime_range_spec,
MapLocationSpec location_spec) TW_PRE_FILTER( ) {
    interpret { n_language=LANGUAGE( ) . [1/50 "language"] } as {
        language_name = n_language->language_name;
        language_code = n_language->iso_code;
    }
    interpret {n_location=MAP_LOCATION{} . [1/10 ("area" | "region")]} as {
        location_spec = n_location->location;
    }
}
static block (string language_name, string language_code, DateTimeRangeSpec datetime_range_spec,
datetime_range_spec, MapLocationSpec location_spec) TW_PRE_EXTENDER( ) {
    interpret {[JOINER( )] . n=TW_PRE_FILTER( )} as {
        if(n->language_name != "") {
            language_name = n->language_name;
            language_code = n->language_code;
        }
    }
    interpret { n_location=MAP_LOCATION( ) . [1/10 ("area" | "region")] } as {
        location_spec = n_location->location;
    }
}
static block (string search_query, string language_name, string language_code, DateTimeRangeSpec
datetime_range_spec, MapLocationSpec location_spec) TW_POST_FILTER_LIST( ) {
    interpret { n=TW_POST_FILTER( ) . n_post=(1/50 TW_POST_EXTENDER( ))* } as {
        search_query="";
        language_name="";
        language_code="";
// language
        if(n) {
            if(n->language_name != "") {
                language_name = n->language_name;
                language_code = n->language_code;
            }
// location
        if(n->location_spec.isSet( )) {
```

```
        location_spec = n->location_spec;
    }
// time range
    if(n->datetime_range_spec.start_datetime_spec.datetime.date_known( ) || n->
datetime_range_spec.end_datetime_spec.datetime.date_known( )) {
        datetime_range_spec = n->datetime_range_spec;
    }
    if(n->search_query != "") {
        search_query =n->search_query;
    }
  }
  if(n_post) {
    for(int i=0; i <n_post_length; i++) {
      if(n_post[i]language_name != "") {
        language_name = n_post[i].language_name;
        language_code = n_post[i].language_code;
      }
      if(n_post[i]location_specisSet( )) {
        location_spec = n_post[i]location_spec;
      }
      if(n_post[i].datetime_range_spec.start_datetime_spec.datetime.date_known( ) ||
n_post[i].datetime_range_spec.end_datetime_spec.datetime.date_known( )) {
        datetime_range_spec =n_post+i!datetime_range_spec;
      }
        if(n_post+itsearch_query != "") {
          search_query = n_post[i].search_query;
        }
      }
    }
  }
}
static block (string search_query, string language_name, string language_code, DateTimeRangeSpec
datetime_range_spec, MapLocationSpec location_spec) TW_POST_FILTER( ) {
  interpret {([1/50 ("written" | (1/10 "posted"))] . "in" . (n_language=LANGUAGE( ) | (1/50 "the" .
n_language=LANGUAGE( ) . "language"))) } as {
    language_name = n_language->language_name;
    language_code = n_language->iso_code;
  }
  interpret { ((([1/50 ("written" | (1/10 "posted"))] . AT_MAP_LOCATION( ) .
n_location=MAP LOCATION( )) | (1/50 [1/50 ("written" (1/10 "posted"))] . AT_MAP_LOCATION( ) .
"the" . n_location=MAP LOCATION( ) . [1/10 ("area" | "region")])) } as {
    location_spec = n_location->location;
  }
  interpret { [1/50 ("written" | (1/10 "posted"))] . ["from"] . n_date=DATE_TIME_RANGE_PAST( ) }
as
{
    if(n_date) {
      datetime_range_spec = n_date->datetime_range_spec;
    }
  }
  interpret { [1/50 ("written" (1/10 "posted"))] . (ABOUT( ) | "for" | "on" | "with") . [1/10
n_hashtag="hashtag"] . (n_wiki=WIKIPEDIA( ))} as {
    if(n_wiki) {
      stdyector<unsigned> wiki_ids;
      size_t match_count = n_wiki->additional_matches + 1;
      for (size_t match_num = 0; match_num < match count; ++match_num) {
        if(!n_wiki->possessiye) {
          wiki_ids.push_back(n_wiki->id);
        }
        n_wiki = n_wiki->next_match;
      }
      if(wiki_ids.size( ) == 0) {
        excludethis( );
      }
      else {
        search_query = wikipediaTable[wiki_ids[0]].title;
      }
    }
    else if(text) {
      search_query =concat_words(text, text_length);
    }
    if(n_hashtag) {
      search_query = stdstring("hashtag ") + search_query;
    }
  }
}
static block (string search_query, string language_name, string language_code, DateTimeRangeSpec
datetime_range_spec, MapLocationSpec location_spec) TW_POST_EXTENDER( ) {
  interpret {[JOINER( )] . n=TW_POST_FILTER( )} as {
    search_query="";
```

```
        language_name="";
        language_code="";
//language
    if(n) {
        if(n->language_name != "") {
            language_name = n->language_name;
            language_code = n->language_code;
        }
// location
    if(n->location_spec.isSet( )) {
        location_spec = n->location_spec;
    }
// time range
    if(n->datetime_range_spec.start_datetime_spec.datetime.date_known( ) || n->
datetime_range_spec.end_datetime_spec.datetime.date_known( )) {
        datetime_range_spec = n->datetime_range_spec;
    }
// search query
    if(n->search_query !="") {
        search_query =n->search_query;
        }
      }
    }
  }
}
extern block(string search query, string language_name, string language_code,
        MapLocationSpec location_spec, int num_results, DateTimeRange Spec datetime_range_spec)
TW_SEARCH( ) {
    interpret { ("twitter" |
        ({[TELL_ME( )] . [1/100 n_filter_search_list=A_LIST_OF( )] .
            [n_prefilter=TW_PRE_FILTER_LISTP( )] . (n_tweet_plural="tweets" |
n_tweet_singular="tweet"))) .
            [n_postfilter=TW_POST_FILTER_LIST( )] } as {
        language_name = "";
        language_code = "";
        // count
        num_results = 10;
        if(n_prefilter && n_prefilter->num_results != −1) {
            num_results = n_prefilter->num_results;
        }
        if((num_results = = 1 && n_tweet_plural) ||
            (num_results != 1 && n_tweet_singular) ||
            (n_filter_search_list && n_tweet_singular)) {
            excludethis( );
        }
        else {
            if(n_prefilter) {
                if(n_prefilter->location_spec.isSet( )) {
                    location_spec = n_prefilter->location_spec;
                }
                // language
                if(n_prefilter->language_name != "") {
                    language_name = n_prefilter->language_name;
                    language_code = n_prefilter->language_code;
                }
            }
            // location
            if(n_postfilter) {
                if(n_postfilter->location_spec.isSet( )) {
                    location_spec =n_postfilter->location_spec;
                }
                // language (post)
                if(n_postfilter->language_name != "") {
                    language_name = n_postfilter->language_name;
                    language_code = n_postfilter->language_code;
                }
                if(n_postfilter->search_query != "") {
                    search_query = n_postfilter->search_query;
                }
                // time range
                datetime_range_spec = n_postfilter->datetime_range_spec;
            }
        }
    }
}
```

What is claimed is:

1. A command-processing server comprising:
a computer processor; and
a computer-readable storage medium storing:
- a library including a plurality of domain command interpreters that produce a set of output variables in response to parsing and interpreting natural language commands matching a <verb> <pre-filters> <object> <post-filters> pattern defined by one of the domain command interpreters, wherein:
  - the <object> specifies a type of search, the <verb> is optional, at least one of the <pre-filters> or <post-filters> consists of a sequence of one or more filters, and each pre-filter or post-filter is a term or clause for narrowing a set of answers to a search query,
  - the verb, pre-filter, object, and post-filter are defined by sub-structure interpreters that interpret sub-expressions of the natural language commands, the sub-structure interpreters being specified by distinct blocks of code in a procedural programming language, and
  - the domain command interpreters include weights that specify expected probabilities of occurrence of different portions of the pattern; and
- executable computer program instructions that when executed by the computer processor perform actions comprising:
  - receiving an imperative natural language command from a client device located remotely from the command-processing server, the natural language command comprising a plurality of filters expressing selection criteria for the search, the pre-filters located before the object in the natural language command and the post-filters located after the object in the natural language command;
  - determining, for the natural language command, a set of output variables corresponding to a first one of the domain command interpreters by interpreting the natural language command according to the first one of the plurality of the domain command interpreters; and
  - using the set of output variables to send a response to a client device.

2. The command-processing server of claim 1, wherein interpreting the natural language command according to the first one of the plurality of the domain command interpreters comprises executing an action defined by the first one of the plurality of the domain command interpreters, the action using the determined set of output variables.

3. The command-processing server of claim 1, the actions further comprising sending the set of output variables to the client device for execution.

4. The command-processing server of claim 1, wherein the domain command interpreters are expressed according to a Backus Naur Form or Extended Backus Naur Form context-free grammar.

5. The command-processing server of claim 1, wherein the domain command interpreters are specified by a plurality of different developers.

6. A computer-implemented method performed by a command-processing server, the method comprising:
accessing a library of domain command interpreters that produce a set of output variables in response to parsing and interpreting natural language commands matching a <verb> <pre-filters> <object> <post-filters> pattern defined by one of the domain command interpreters, wherein:
  - the <object> specifies a type of search, the <verb> is optional, at least one of the <pre-filters> or <post-filters> consists of a sequence of one or more filters, and each pre-filter or post-filter is a term or clause for narrowing a set of answers to a search query;
  - the verb, pre-filter, object, and post-filter are defined by sub-structure interpreters that interpret sub-expressions of the natural language commands, the sub-structure interpreters being specified by distinct blocks of code in a procedural programming language, and
  - the domain command interpreters include weights that specify expected probabilities of occurrence of different portions of the pattern;
receiving an imperative natural language command from a user, the natural language command comprising a plurality of filters expressing selection criteria for the search, the pre-filters located before the object in the natural language command and the post-filters located after the object in the natural language command;
determining, for the natural language command, a set of output variables corresponding to a first one of the domain command interpreters by interpreting the natural language command according to the first one of the plurality of the domain command interpreters; and
using the set of output variables to send a response to a client device.

7. The computer-implemented method of claim 6, wherein the domain command interpreters are specified by a plurality of different developers.

8. The computer-implemented method of claim 6, wherein the domain command interpreters are expressed according to a Backus Naur Form or Extended Backus Naur Form context-free grammar.

9. The computer-implemented method of claim 6, wherein interpreting the natural language command according to the first one of the plurality of the domain command interpreters comprises executing an action defined by the first one of the plurality of the domain command interpreters, the action using the determined set of output variables.

10. The command-processing server of claim 6, the actions further comprising sending the set of output variables to a client device of the user for execution.

11. A non-transitory computer-readable storage medium storing:
a library of domain command interpreters that produce a set of output variables in response to parsing and interpreting natural language commands matching a <verb> <pre-filters> <object> <post-filters> pattern defined by one of the domain command interpreters, wherein:
  - the <object> specifies a type of search, the <verb> is optional, at least one of the <pre-filters> or <post-filters> consists of a sequence of one or more filters, and each pre-filter or post-filter is a term or clause for narrowing a set of answers to a search query;
  - the verb, pre-filter, object, and post-filter are defined by sub-structure interpreters that interpret sub-expressions of the natural language commands, the sub-structure interpreters being specified by distinct blocks of code in a procedural programming language, and the domain command interpreters include weights that specify expected probabilities of occurrence of different portions of the pattern; and executable computer program instructions that when executed by a computer processor perform actions comprising:
- receiving an imperative natural language command from a user, the natural language command comprising a plurality of filters expressing selection criteria for the search, the pre-filters located before the object in the natural language command and the post-filters located after the object in the natural language command;
- determining, for the natural language command, a set of output variables corresponding to a first one of the domain command interpreters by interpreting the natural language command according to the first one of the plurality of the domain command interpreters; and
- using the set of output variables to send a response to a client device.

12. The non-transitory computer-readable storage medium of claim 11, wherein the domain command interpreters are specified by a plurality of different developers.

13. The non-transitory computer-readable storage medium of claim 11, wherein the domain command interpreters are expressed according to a Backus Naur Form or Extended Backus Naur Form context-free grammar.

14. The non-transitory computer-readable storage medium of claim 11, wherein interpreting the natural language command according to the first one of the plurality of the domain command interpreters comprises executing an action defined by the first one of the plurality of the domain command interpreters, the action using the determined set of output variables.

15. The non-transitory computer-readable storage medium of claim 11, the actions further comprising sending the set of output variables to a client device of the user for execution.

* * * * *

UNITED STATES PATENT AND TRADEMARK OFFICE
CERTIFICATE OF CORRECTION

PATENT NO. : 11,238,101 B1
APPLICATION NO. : 17/081996
DATED : February 1, 2022
INVENTOR(S) : Keyvan Mohajer It is certified that error appears in the above-identified patent and that said Letters Patent is hereby corrected as shown below:

In the Claims

In Column 26, Claim 10, Line 46, delete "command-processing server" and insert
-- computer-implemented method --, therefor.

Signed and Sealed this
Twenty-eighth Day of June, 2022

Katherine Kelly Vidal
*Director of the United States Patent and Trademark Office*